United States Patent

Stramel

Patent Number: 5,830,929
Date of Patent: Nov. 3, 1998

[54] TREATMENT OF PIGMENTS FOR IMPROVED DISPERSIBILITY AND CONCENTRATION IN THERMOPLASTIC RESINS

[75] Inventor: Rodney D. Stramel, Edmond, Okla.

[73] Assignee: Kerr-McGee Chemical Corporation

[21] Appl. No.: 794,192

[22] Filed: Jan. 24, 1997

Related U.S. Application Data

[63] Continuation of Ser. No. 518,431, Aug. 23, 1995, abandoned.

[51] Int. Cl.$^6$ ................ C08K 3/22; C08K 5/11
[52] U.S. Cl. .......... 523/200; 524/166; 524/540; 524/570; 524/577; 106/503
[58] Field of Search ............ 523/200; 524/166, 524/577, 570, 540; 106/503

[56] References Cited

U.S. PATENT DOCUMENTS

| | | | |
|---|---|---|---|
| 4,524,160 | 6/1985 | Maeda et al. | 523/200 |
| 4,749,506 | 6/1988 | Kitahara et al. | 523/200 |
| 4,985,287 | 1/1991 | Tachibana | 523/200 |
| 5,260,353 | 11/1993 | Palmer et al. | 523/200 |

*Primary Examiner*—Andrew E. C. Merriam
*Attorney, Agent, or Firm*—Herbert M. Hanegan; J. Rodgers Lunsford, III; Charles L. Warner, II

[57] ABSTRACT

Thermoplastic concentrates comprising inorganic pigments, such as titanium dioxide, treated with a dialkyl sulfosuccinate treating agent, of the formula ROOCCHSO$_3$MCH$_2$COOR', where R and R' are monovalent alkyl radicals containing from about 2 to about 20 carbon atoms and M is a metallic monovalent cation, are disclosed. Such treatment improves the dispersibility of the pigments in thermoplastic resins. The treatment also enables the production of thermoplastic concentrates comprising a high percentage of treated inorganic pigment dispersed in a thermoplastic resin.

16 Claims, No Drawings

TREATMENT OF PIGMENTS FOR IMPROVED DISPERSIBILITY AND CONCENTRATION IN THERMOPLASTIC RESINS

This is a continuation, of application Ser. No. 08/518,431, filed Aug. 23, 1995 now abandoned.

BACKGROUND OF THE INVENTION

1. Field of the Invention

The present invention relates to thermoplastic concentrates containing a high concentration of inorganic pigment and a method for their production. More specifically, the present invention relates to surface treatment of inorganic pigments for improved dispersibility in thermoplastic resins. Most specifically, the present invention relates to treating titanium dioxide pigments with a dialkyl sulfosuccinate treating agent for increased concentration and dispersion in polyolefin resins.

2. Description of the Prior Art

Inorganic pigments, such as titanium dioxide for example, are used in a variety of thermoplastic resin-based consumer goods. It is known, however, that the quality of the properties that the inorganic pigment imparts to the resin, such as opacity, color, brightness, UV and thermal stabilization, and the like, depends significantly on how evenly and uniformly the pigment is dispersed in the resin, as well as on the amount of pigment that can be effectively incorporated into the resin. It is also known that the hydrophobic nature of such thermoplastic resins is incompatible with the hydrophilic nature of such inorganic pigments thus makIng it difficult to obtain good dispersion of the pigments in the resins, especially at high pigment concentrations greater than 50 percent by weight, as pointed out in U.S. Pat. No. 4,183,843, which disclosed the use of a polar phosphate ester surfactant on alumina trihydrate to lower the viscosity of polyester inorganic filler composites.

The chemical surface treatment of inorganic pigments to improve dispersibility in, and increase compatibility with, thermoplastic resins, is known in the art. For example, U.S. Pat. No. 4,209,430 discloses the treatment of inorganic pigments with phosphorylated polyenes, which are the reaction products of a phosphorylating agent and a polyolefinically unsaturated compound of at least 10 carbon atoms. The pigments thus treated are described as possessing improved pigment properties as well as improved dispersibility and a reduced tendency to yellow in thermoplastic polyolefins in which the treated pigments are dispersed.

U.S. Pat. Nos. 4,357,170 and 4,377,417 also disclose inorganic pigment treatments for reducing the yellowing tendency of polymeric compositions containing such pigments. According to these patents, treating pigmentary titanium dioxide with an additive system comprised of an organophosphate/alkanolamine addition product, alone or in combination with a polyol, results in a reduction of the tendency of the treated pigment to yellow in polymeric compositions. These patents, however, do not mention any improved dispersibility benefit afforded by such treatment.

Examples of inorganic pigment treatments to which improved dispersibility benefits have been ascribed include the treatment disclosed in U.S. Pat. No. 5,288,320, which is identical to GB patent No. 2,252,306. These patents teach the treatment of titanium dioxide with an ester or partial ester of a hydroxy compound containing from 1 to 6 hydroxyl groups and an aliphatic saturated monocarboxylic acid having between 10 and 12 carbon atoms. Also, U.S. Pat. No. 3,728,142 discloses the treatment of inorganic pigments with non-drying fatty acid-modified alkyd resins for improved pigment dispersibility in plastics. A further example of the surface treatment of inorganic pigments for improved dispersibility is found in U.S. Pat. No. 3,754,956, which discloses the treatment of titanium dioxide pigments with a liquid polylactone having terminal hydroxy groups. Still another method of treating titanium dioxide pigments to achieve good dispersion and optical properties is described in U.S. Pat. No. 4,235,768, which discloses the art of treating titanium dioxide pigments with an aqueous polymer solution containing carboxyl groups. Also, U.S. Pat. No. 5,318,625 teaches the treatment of inorganic pigments with organophosphate esters for improved dispersibility and for production of polymeric concentrates.

None of the aforementioned patents suggests or teaches either the treatment of inorganic pigments with a dialkyl sulfosuccinate or the production therefrom of thermoplastic concentrates which are the subject of this application.

SUMMARY OF THE INVENTION

The present invention provides inorganic pigments characterized by improved processibility and dispersibility in thermoplastic resins. The improved inorganic pigments, preferably titanium dioxide pigments, have deposited thereon at least one dialkyl sulfosuccinate treating agent corresponding to the formula $ROOCCHSO_3MCH_2COOR'$. In this formula, R and R' are monovalent alkyl radicals containing from about 2 to about 20 carbon atoms and M is a metallic monovalent cation. The present invention further provides pigmented thermoplastic concentrates comprising a thermoplastic resin as a continuous phase and the above described diaLkyl sulfosuccinate treated inorganic pigment as a disperse phase.

DETAILED DESCRIPTION OF THE PREFERRED EMBODIMENTS

The inorganic pigments which can be subjected to treatment with the hereinafter described dialkyl sulfosuccinate treating agents to provide the improved inorganic pigments of the present invention include any of the white or colored, opacifying or non-opacifying particulate inorganic pigments (or mineral pigments) known and employed in the surface coatings (e.g., paint) and plastics industries. For purposes of this present description, the term inorganic pigments is employed broadly to define materials which are particulate by nature and nonvolatile in use and typically are most usually referred to as inerts, fillers, extenders, reinforcing pigments and the like.

Representative but non-limiting examples of inorganic pigments which can be treated as herein described to provide the improved inorganic pigments of this invention include white opacifying pigments such as titanium dioxide, basic carbonate white lead, basic sulfate white lead, basic silicate white lead, zinc sulfide, zinc oxide, composite pigments of zinc sulfide and barium sulfate, antimony oxide and the like, white extender pigments such as calcium carbonate, calcium sulfate, china and kaolin clays, mica, diatomaceous earth and colored pigments such as iron oxide, lead oxide, cadmium sulfide, cadmium selenide, lead chromate, zinc chromate, nickel titanate, chromium oxide and the like. Of all the inorganic pigments useful in producing the improved inorganic pigments of the present invention, a most preferred pigment is that of pigmentary titanium dioxide.

In general, the preferred titanium dioxide pigment for use in preparing an improved pigment of this invention can be of either the anatase or rutile crystalline structure or some combination thereof. This pigment may be produced by way of various known commercial processes which are familiar to those of skIll in this art but which processes do not form any part of the present invention. Thus, this particular pigment can be one produced by either the well known sulfate process or the well known vapor phase oxidation process. The former process, i.e., the sulfate process, typically involves the steps of leaching a titaniferous ore with sulifuric acid to produce a titanium sulfate solution, hydrolysis of the titanium sulfate to form a titanium dioxide precipitate and calcination of this precipitate in the presence of suitable additives to develop the desired crystalline structure in the fmal calcined titanium dioxide product. In the latter process, i.e., the vapor phase oxidation process, a titanium halide such as titanium tetrachloride is oxidized in the vapor phase at elevated temperatures to produce what is commonly referred to as raw titanium dioxide. This raw pyrogenic titanium dioxide product is then recovered, subjected to milling and classification operations and, following treatment to deposit various hydrous metal oxide coatings upon the pigment, subjected to a final milling step to provide a pigment of the desired particle size.

Typically, the final milling step will comprise the use of fluid energy milling techniques. These techniques involve conveying the pigment through a milling apparatus such as the fluid energy mills disclosed in U.S. Pat. Nos. 2,032,827 and 2,219,011 using one or more gaseous streams produced by jets of a milling fluid such as air or steam to effect collision between individual pigment particles and thus a reduction in size of such particles. Various additive materials may be incorporated into the pigment during the fluid energy milling either to improve the milling of the pigment as disclosed in U.S. Pat. No. 3,531,310 or to enhance particular chemical, physical, and optical properties of the resultant milled pigment as disclosed in U.S. Pat. No. 4,752,340. Representative but non-limiting examples of such additive materials include polyols such as glycerol, pentaerythritol trimethylolethane, trimethylolpropane and the like, fatty acids such as oleic acid, stearic acid and the like, trialkanolamines such as triethanolamine and the like and amine salts such as triethanolamine melonate triisopropanolamine succinate and the like.

The amounts of the above disclosed additive materials which can be employed may vary broadly. Such broad variance depends upon both the particular additive material employed and the particular purpose for which it is added. Thus, for example, additive materials employed as aids to the milling of the titanium dioxide pigment will be utilized in amounts ranging from about 0.05 to about 5.0 weight percent based on the weight of the pigment. However, amounts of additive materials employed to modify any one or more of the chemical, physical, or optical properties of the pigment typically will range from about 0.01 to about 10.0 weight percent based on the weight of the pigment.

Like the additive materials disclosed above, the dialkyl sulfosuccinate treating agents employed to provide the improved titanium dioxide pigment and the other inorganic pigments of this invention can also be readily deposited onto this pigment during the fluid energy milling thereof. However, other convenient methods for treating the titanium dioxide and other inorganic pigments disclosed herein with the dialkyl sulfosuccinate treating agent can be used. Such other methods include, for example, applying the treating agent to the pigments by spraying or otherwise mixing the treating agent with the dry pigments. Thus the treating agent can be applied to the pigments by addition of the treating agent to the pigments through the intensifier bar of a v-blender or by spraying the treating agent into a screw conveyor or paddle mixer containing the pigments.

As disclosed hereinabove, the dialkyl sulfosuccinate treating agents useful in providing inorganic pigments of improved thermoplastic resin dispersibility include those compounds corresponding to the formula, $ROOCCHSO_3MCH_2COOR'$. In this formula, R and R' are defined as being monovalent alkyl radicals containing from about 2 to about 20 carbon atoms, preferably from about 4 to about 14 carbon atoms and most preferably about 8 carbon atoms and M is a metallic monovalent cation, most preferably, sodium. The monovalent alkyl radicals, R and R', in this formula, can be either straight-chain or branched-chain alkyl radicals. R may, but need not, equal R'. Representative examples of such radicals include methyl, ethyl, n-propyl, isobutyl, n-pentyl, isopentyl, n-hexyl, octyl, tridecyl radicals and the like. Non-limiting examples of dialkyl sulfosuccinate treating agents useful in preparing the improved inorganic pigments of the present invention include dioctyl sodium sulfosuccinate, diisobutyl sodium sulfosuccinate, bis-tridecyl sodium sulfosuccinate, dihexyl sodium sulfosuccinate and the like.

The amount of dialkyl sulfosuccinate employed to treat the inorganic pigments described hereinabove, and particularly titanium dioxide pigment, will be an amount sufficient to provide a treated pigment exhibiting a dispersibility in thermoplastic resins greater than that of the pigment prior to treatment. Broadly, the amount of the dialkyl sulfosuccinate treating agent employed will be an amount ranging from about 0.1 to about 5 weight percent based upon the weight of the pigment, preferably an amount ranging from about 0.3 to about 1.2 weight percent.

The resulting dialkyl sulfosuccinate treated inorganic pigments can be employed to readily and uniformly pigment a wide variety of thermoplastic resins. These include such well known classes of thermoplastic resins as polyolefin resins, acrylic resins, polyester resins, polyamide resins, epoxy resins, phenolic resins, poly(vinylaromatic) resins, poly(vinylhalide) resins, polycarbonate resins, polyurethane resins, and the like. Representative, but non-limiting, examples of these various classes of thermoplastic resins include: polyolefin resins such as polyethylene, polypropylene, and the like; acrylic resins such as poly (acrylic acid), poly(methacrylic acid), poly(methylacrylate), poly(methylmethacrylate), and the like; polyester resins such as poly(ethylene terephthalate), poly(butylene terephthalate) and the like; polyamide resins such as nylon-6 and nylon-6,6, and the like; epoxy resins such as poly (epichlorohydrin/bisphenol A) and the like and esters thereof such as those prepared by the esterification of poly (epichlorohydrin/bisphenol A) with a fatty acid, resin acid, tall oil acid or mixtures thereof; phenolic resins such as those derived from the reaction of formaldehyde with phenol, resorcinol, cresol, p-phenylphenol, and the like; poly (vinylaromatic) resins such as polystyrene and copolymers thereof such as poly(styrene-acrylonitrile), poly(styrene-butadiene-acrylonitrile), and the like; poly(vinylhalide) resins, such as poly(vinylchloride), poly(vinylchloride/vinylidene chloride) and the like; polycarbonate resins such as those attained either by the phosgenation of dihydroxy aliphatic or aromatic monomers such as ethylene glycol, propylene glycol, bisphenol A (i.e., 4,4'-isopropylidene diphenol), and the like or by the base catalyzed transesterification of bisphenol A with diphenyl carbonate to produce bisphenol A polycarbonate; and polyurethane resins obtained by the reaction of di- or polyfunctional hydroxy compounds such as glycols or hydroxyl terminated polyesters and polyethers with di- or polyfunctional diisocyanates.

The amounts of the dialkyl sulfosuccinate treated inorganic pigments of this invention which can be added directly to the above described thermoplastic resins can vary widely depending upon the intended end use for these resins. Thus, thin films sometimes will require very high pigment levels while thick paints may only require a very small percentage. Accordingly, the amount of the treated pigment employed can range from as little as about 1 weight percent to as much as about 80 weight percent based upon the weight of the thermoplastic resin.

In yet a further embodiment of the present invention, the diallyl sulfosuccinate treated inorganic pigments of the present invention have exhibited particular utility in the preparation of thermoplastic concentrates. Broadly, these thermoplastic concentrates will comprise a continuous phase constituting a thermoplastic resin and a disperse phase constituting the dialkyl sulfosuccinate treated inorganic pigments of this invention. The continuous phase may comprise any of the thermoplastic resins hereinbefore described, including the polyolefin resins, acrylic resins, polyester resins, polyamide resins, epoxy resins, phenolic resins, poly(vinylaromatic) resins, poly(vinylhalide) resins, polycarbonate resins, polyurethane resins, and the like.

In preparing the thermoplastic concentrates of the present invention, the amount of pigment incorporated into the thermoplastic resin continuous phase can vary widely. In general, this amount will vary depending upon the level of pigmentation desired or required in the final or finished end product employing these thermoplastic concentrates as pigmenting vehicles, and the effectiveness of the processing equipment utilized to reduce, dilute or dissolve the thermoplastic concentrates in the thermoplastic resins used to produce the final or finished end products. Broadly, the thermoplastic concentrates of this invention may contain weight ratios of the treated inorganic pigment to the thermoplastic resin in which it is dispersed ranging from about 0.5:1 to about 5:1. Within such range, the treated inorganic pigment of the present invention can be easily and uniformly dispersed or distributed throughout the thermoplastic resin employed as the continuous phase of the thermoplastic concentrate produced.

Processes and process equipment useful in the preparation of the above described thermoplastic concentrates are known and do not form any part of this aspect of this invention. Such known processes generally involve mixing and/or blending techniques utilizing equipment capable of handling high plastic viscosity materials. Illustrative of equipment typically employed in mixing and/or blending processes include various kneader type dispersers, such as the Banbury mixer, single and multi-roll mills, and the like. A more detailed description of such mixing and/or blending processes and the equipment which may be employed therein can be found in Kirk-Othmer, Encyclopedia of Chemical Technology, 2nd Ed., Vol. 15, pages 592–596.

The invention is further described and illustrated by the following examples. These examples represent specific embodiments of the invention and are not to be construed as limitations thereon.

EXAMPLE 1

A rutile titanium dioxide product of the Kerr-McGee Corporation of Oklahoma City, Okla. marketed under the trade designation CR-834 was prepared from the chloride process and was steam micronized with a polyol milling aid, specifically trimethylol ethane ("TME"). The particulate titanium dioxide was then dry treated with dioctyl sodium sulfosuccinate as a fine mist or spray at a concentration of about 0.75 percent by weight of pigment. Specifically, the titanium dioxide and dioctyl sodium sulfosuccinate were mixed in a v-blender in which the dioctyl sodium sulfosuccinate was added through the intensifier bar.

The dispersibility of the treated titanium dioxide as compared to untreated titanium dioxide was then determined. That is, the mixing bowl of a Brabender Plasticorder Model PL-2000 was loaded with 36.50 g of a polystyrene resin marketed by the Dow Chemical Company under the trade designation STYRON®#615, 0.31 g of zinc stearate as a lubricant, and 109.50 g of the above described treated titanium dioxide. The bowl temperature was set at 160° C. and the blade speed at 150 rpm. The torque and temperature were then recorded vs. time. The procedure was repeated using untreated titanium dioxide in order to compare the dispersibility of the treated titanium dioxide with untreated titanium dioxide. The procedure was also repeated using other dialkyl sulfosuccinate treating agents, namely, diisobutyl sodium sulfosuccinate and bis tridecyl sodium sulfosuccinate. The results of these tests are set forth in Table I below.

TABLE I

| Sample | Equilibrium Torque | Processing Temperature |
|---|---|---|
| 1 | 1,990 | 185 |
| 2 | 1,900 | 174 |
| 3 | 1,840 | 177 |
| 4 | 1,860 | 176 |

1. Titanium dioxide steam micronized with TME
2. Sample 1 treated with 0.75% dioctyl sodium sulfosuccinate
3. Sample 1 treated with Diisobutyl sodium sulfosuccinate
4. Sample 1 treated with Bis(tridecyl) sodium sulfosuccinate Samples one and two were re-evaluated at lower processing temperature, 140° C.

TABLE II

| Sample | Equilibrium Torque | Processing Temperature |
|---|---|---|
| 1 | 2,010 | 161 |
| 2 | 1,840 | 157 |

1. Titanium dioxide steam micronized with TME
2. Sample 1 treated with 0.75 percent dioctyl sodium sulfosuccinate Improved processibility and dispersibility of the 75 percent pigment thermoplastic concentrate is demonstrated by the lower processing torque and temperature of the dioctyl sodium sulfosuccinate treated samples.

EXAMPLE 2

This example deals with steam micronizing dioctyl sodium sulfosuccinate onto the pigment. Titanium dioxide was prepared from the chloride process. The samples were steam micronized with dioctyl sodium sulfosuccinate. The torque and temperature profiles were then measured using the method discussed in Example 1. That is, a ternary mixture containing 36.5 g polystyrene (Dow Styron #615 or other general purpose polystyrene) 0.31 g zinc stearate and 109.5 g of the above described treated titanium dioxide was prepared and loaded into the mixing bowl of a Brabender Plasticorder Model PL-2000 having Cam type blades. The bowl temperature was set at 140° C., and the blade speed at 150 rpm. The torque and temperature profiles were measured and the data are tabulated in Table III.

TABLE III

| Sample | Equilibrium Torque | Processing Temperature |
|---|---|---|
| 1 | 1,647 | 186 |
| 2 | 1,450 | 176 |

1. Micronized with TME
2. Micronized with 0.75 percent dioctyl sodium sulfosuccinate Again, improved processibility of the 75 percent pigment thermoplastic concentrate is demonstrated by the lower processing torque and temperature of the dioctyl sodium sulfosuccinate treated sample.

Thus, the present invention is well adapted to carry out the objects and obtain the ends and advantages mentioned as well as those inherent therein. While presently prepared embodiments of the invention have been described herein, it is to be understood that modifications and changes can be made in the treated pigments and concentrates of the present invention without departing from the spirit or scope of the invention as set forth in the following claims.

What is claimed is:

1. Thermoplastic concentrates comprising an inorganic pigment dispersed in a thermoplastic resin, said pigment having deposited thereon a dialkyl sulfosuccinate treating agent corresponding to the formula $ROOCCHSO_3MCH_2COOR'$ wherein R and R' are monovalent alkyl radicals having no unsaturation containing from about 2 to about 20 carbon atoms and M is a metallic monovalent cation; said dialkyl sulfosuccinate treating agent being deposited upon said pigment in a dry-treating operation without the presence of aqueous metal ions in an amount ranging from about 0.1 percent to about 5 percent by weight and wherein said dispersed pigment is present in an amount in the range of from about 33.33 percent to about 83.33 percent by weight based upon the combined weight of the thermoplastic resin and the inorganic pigment.

2. The thermoplastic concentrates of claim 1 wherein the amount of said inorganic pigment dispersed in said thermoplastic resin is in the range of from about 3 parts to about 5 parts by weight per 1 part by weight of said thermoplastic resin.

3. A process for preparing a thermoplastic concentrate comprising the steps of:
   (a) depositing a dialkyl sulfosuccinate treating agent on an inorganic pigment material in a dry-treating operation without the presence of aqueous metal ions; and
   (b) dispersing said pigment material having said treating agent deposited thereon in a thermoplastic resin,
   wherein said treating agent is of the formula $ROOCCHSO_3MCH_2COOR'$ wherein R and R' are monovalent alkyl radicals having no unsaturation and having from about 2 to about 20 carbon atoms, and M is a metallic monovalent cation, and
   wherein said treating agent is deposited on said pigment material in step (a) in an amount in the range of from about 0.1 percent to about 5 percent by weight based on the weight of said pigment material and wherein the amount of said pigment material dispersed in said thermoplastic resin in step (b) is in the range of from about 33.33 percent to about 83.33 percent by weight based on the combined weight of said pigment material and said thermoplastic resin.

4. The process of claim 3 wherein R and R' are monovalent alkyl radicals having from about 4 to about 14 carbon atoms each.

5. The process of claim 4 wherein R and R' are monovalent alkyl radicals having about 8 carbon atoms each and M is sodium.

6. The process of claim 3 wherein said pigment material is titanium dioxide.

7. The process of claim 3 wherein said treating agent is dioctyl sodium sulfosuccinate.

8. The process of claim 3 wherein said thermoplastic resin is a poly(vinylaromatic) resin.

9. The process of claim 3 wherein said thermoplastic resin is polystyrene.

10. The process of claim 3 wherein said treating agent is deposited on said pigment material in step (a) in an amount in the range of from about 0.3 percent to about 1.2 percent by weight based on the weight of said pigment material.

11. The process of claim 10 wherein said treating agent is deposited on said pigment material in step (a) in the amount of about 0.75 percent by weight based on the weight of said pigment material.

12. The process of claim 3 wherein the amount of said pigment material dispersed in said thermoplastic resin is in the range of from about 3 parts to about 5 parts by weight per 1 part by weight of said thermoplastic resin.

13. The process of claim 3 wherein:
   R and R' are monovalent alkyl radicals having 8 carbon atoms each;
   M is sodium;
   said inorganic pigment material is titanium dioxide; and
   the amount of said treating agent is in the range of from about 0.3 percent to about 1.2 percent by weight based on the weight of said inorganic pigment material.

14. The process of claim 13 wherein the amount of said treating agent is about 0.75 percent by weight based on the weight of said inorganic pigment material.

15. The process of claim 13 wherein said thermoplastic resin is polystyrene.

16. The process of claim 13 wherein the amount of said pretreated pigment material dispersed in said thermoplastic resin is in the range of from about 3 parts to about 5 parts by weight per 1 part by weight of said thermoplastic resin.

* * * * *